No. 772,531. PATENTED OCT. 18, 1904.
J. ST. V. PLETTS.
VARIABLE SPEED GEARING.
APPLICATION FILED FEB. 17, 1904.
NO MODEL. 2 SHEETS—SHEET 1.
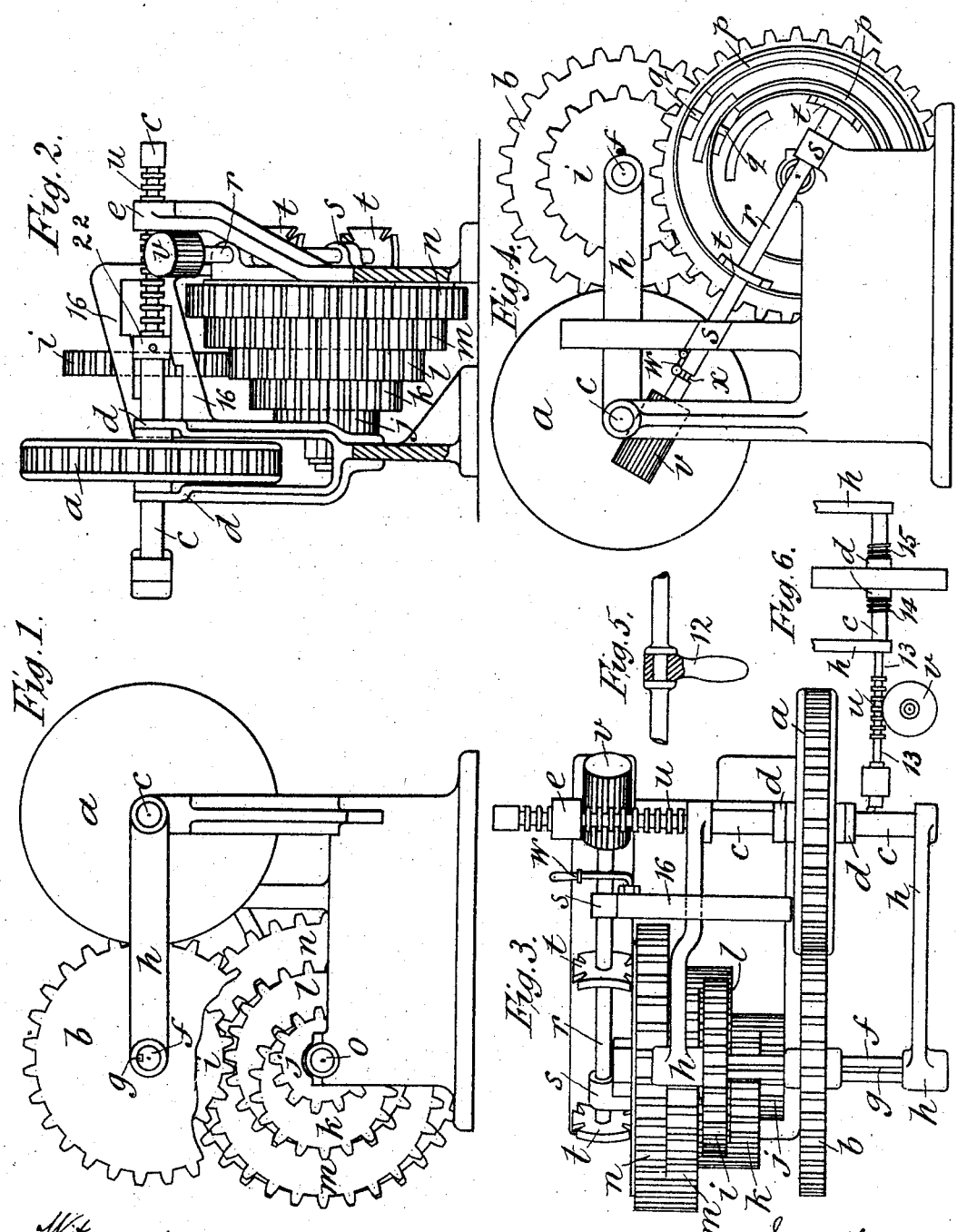
Witnesses.
John C. O'Shea
J. Spragg Poole
Inventor.
John St. V. Pletts.
by Herbert W. T. Jenner.
Attorney.

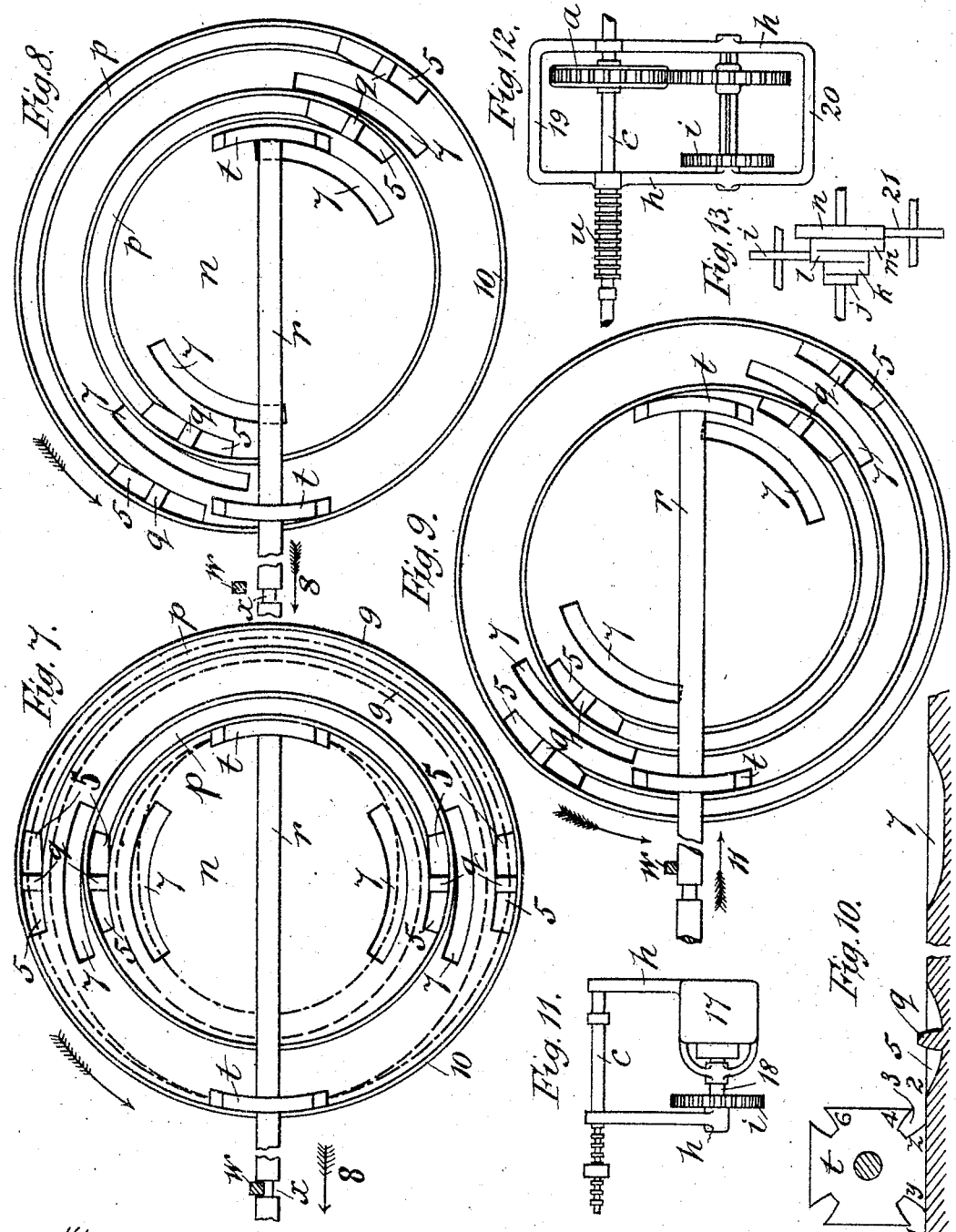

No. 772,531. Patented October 18, 1904.

UNITED STATES PATENT OFFICE.

JOHN ST. VINCENT PLETTS, OF LONDON, ENGLAND.

VARIABLE-SPEED GEARING.

SPECIFICATION forming part of Letters Patent No. 772,531, dated October 18, 1904.

Application filed February 17, 1904. Serial No. 194,041. (No model.)

*To all whom it may concern:*

Be it known that I, JOHN ST. VINCENT PLETTS, residing at Chester House, Wickham Road, Brockley, London, S. E., England, have invented certain new and useful Improvements in Variable-Speed Gearing; and I do hereby declare the following to be a full, clear, and exact description of the invention, such as will enable others skilled in the art to which it appertains to make and use the same.

This invention relates to a new or improved variable-speed gear, the object of which is to provide a gear having a positive drive the ratio of speed of which may be changed as desired while it is running and transmitting power, the change being gradual and without jerk, the teeth being always in contact. The said gear is applicable to various kinds of machinery and is especially adapted for electrically-driven machinery which has to constantly stop and restart.

The accompanying drawings illustrate a method of carrying out my invention, the construction and arrangement of which may be modified to adapt it to different classes of machinery.

Figure 1 is a side elevation of the improved gear, one of the gear-wheels being partly broken away for clearness. Fig. 2 is an end elevation at right angles to Fig. 1. Fig. 3 is a plan, and 4 a side elevation the reverse of Fig. 1. Fig. 5 is a separate view of a handle which may be used for moving the shaft which changes the gear, and Fig. 6 is a plan of a modified arrangement for automatically rendering inoperative the shifting gear-shaft. Fig. 7 is a side or face view, to a larger scale, of the arrangement for effecting the endwise motion of the shaft which changes the gear;
and Figs. 8 and 9 are similar views showing different positions of the said wheel and shaft. Fig. 10 is a straight-line development of a portion of the said wheel, showing one of the Maltese-cross wheels hereinafter referred to.
Fig. 11 is a plan showing a method of direct coupling. Fig. 12 is a plan of an arrangement in which neither of the machines connected may move. Fig. 13 is a diagram showing how seven possible ratios of speed may be obtained.

As will be seen, the wheel $a$ is geared to the wheel $b$ and turns freely upon the shaft $c$ between the bearings $d$, the shaft itself being able to turn and to move lengthwise in the said bearings and also in the bearing $e$, while the bearings $d$ prevent endwise movement of the wheel $a$. The wheel $b$ is mounted upon the shaft $f$ and revolves with the latter by means of a pin engaging with a groove $g$, which at the same time permits of the endwise movement of the said shaft, the wheel being prevented from shifting by means of the side flanges on the wheel $a$. The shaft $f$ turns in the bearings $h$, which being fixed to the shaft $c$ keep the wheels $a$ and $b$ at a constant distance and the shafts $c$ and $f$ parallel. The wheel $i$ is fixed to the shaft $f$ and is capable of gearing with any of the wheels $j$, $k$, $l$, $m$, or $n$, which are fixed together or formed in one and turn upon or with the shaft $o$. The gear-wheels $j$, $l$, and $n$ are concentric, and the gear-wheels $k$ and $m$ are eccentric, so that only a portion of their circumferences coincide with that of the wheel on each side of them.

It is evident that if a wheel of the driving-machine gears with wheel $a$ and a wheel of the machine to be driven with the wheel $j$, $l$, or $n$, or vice versa, three different ratios of speed may be obtained, according as the wheel $i$ gears with wheel $j$, $l$, or $n$. Moreover, the gear may be changed over the whole range while the machine is running and transmitting power, as the wheel $i$ may slide from, for instance, $n$ to $m$ at their point of coincidence, and then from $m$ to $l$ at their point of coincidence, and so on, without ever getting out of gear.

In order to effect the movement of the wheel $i$ at the right moment and through the correct distance, I provide the following arrangement: On the outer side or face of the wheel $n$ are formed ridges inclosing the paths $p$, a tooth $q$ being formed at each end of the said paths, and on the inclined shaft $r$, Fig. 4, which is supported by the bearings $s$, are two Maltese-cross-shaped wheels $t$, the faces or sides of which bear upon and travel along the said paths as the wheel is turned.

The wheel $i$ should move only when it is over the point of coincidence of a concentric and an eccentric wheel and then quickly to its new position. This may be effected by shifting the shaft $c$ at the right moment and through the right distance, so correspondingly shifting the shaft $f$ through the connections $h$, and thus also the wheel $i$, mounted on the said shaft $f$. As the wheel $i$ moves from wheel $j$ to wheel $n$ the bearings $h$ are gradually raised, and therefore to a certain extent the shaft $c$ turns. The shaft $c$ is formed with collars $u$, which gear with the teeth of a wheel or pinion $v$, mounted on the end of the shaft $r$, the collars $u$ being cut right around the shaft, so that the latter may revolve without moving the pinion $v$. The latter also, owing to its length, can move endwise to a certain extent without interfering with the shaft $c$.

$w$ is a pivoted catch which engages with a notch $x$, cut around the shaft $r$ for holding the latter in a fixed position; but when the catch is raised the said shaft is free to move endwise. If the shaft $r$, and consequently the pinion $v$, be revolved, the shaft $c$ will be shifted in one direction or the other, according to the direction in which the shaft $r$ turns, and the pinion $v$ is of such a size that one-quarter of a revolution of the shaft $r$ causes the shaft $c$ to move through exactly the required distance to shift the wheel $i$ from one gear-wheel to the intermediate eccentric wheel, and then when the wheel $n$ has made a half-revolution another quarter of a turn of the shaft $r$ suffices to carry the wheel $i$ from the intermediate eccentric wheel on to the next concentric gear-wheel, and in this manner one step or change in the gear is obtained.

The turning of the shaft $r$ is effected by the cross-shaped wheel $t$ in the following manner: As seen in Fig. 10, one side or surface $y\,z$ of the wheel $t$ is bearing upon the flat surface 1 2 of the wheel $n$, so that the wheel $t$ is unable to revolve; but when the latter reaches the tooth $q$ by reason of the revolution of the wheel $n$ the notch 3, formed in the wheel $t$, engages with the said tooth $q$ and causes a quarter-revolution of the wheel $t$, the points 4 and $z$ of the latter fitting into the depressions 5, one on each side of the said tooth. The continued movement of the wheel $n$ locks the cross-wheel $t$ by bearing against the flat side 4 6 until it is again operated by the tooth $q$, arranged at the other end of the path $p$ at a point diametrically opposite the first tooth, when the wheel $t$ is again caused to turn a quarter of a revolution.

7 7 are further depressions formed in the face of the wheel $n$, which as they come opposite the wheel $t$ enable the latter to turn freely in either direction.

As will be seen by Fig. 7, when the wheel $n$ revolves in the direction of the arrow the two wheels $t$ will follow or travel in the paths shown by the dotted lines, (thus, ……,) which being flat surfaces all the way prevent the rotation of the said wheels. If, however, the shaft $r$ be moved in the direction of the arrow 8, Fig. 7, the wheels $t$ will follow or travel in the paths shown by the dot-and-dash lines, (thus, —.—.—.—,) Fig. 7.

As the wheel $n$ turns the depression 5 comes opposite one of the wheels $t$, and the tooth $q$ turns the latter through a quarter of a revolution. The wheel $t$ then enters the concentric path $p$, which passes underneath it and where it is held by the ridges 9 until a second depression 5 is met, which enables it to be turned another quarter of a revolution by the second tooth $q$, after which it will be brought back to its old path (the dotted line, ……) by the eccentric ridge 10. The ridges 9 also prevent the wheels $t$ entering the paths $p$ except by turning over a tooth $q$.

When the first wheel $t$ is turning over the outer tooth $q$, the second wheel $t$ will be over the inner depression 7, and will therefore turn freely. The catch $w$ is raised by its handle, as shown in Fig. 3, to permit of the movement of the shaft $r$, and when the said shaft is moved in the direction of the arrow 11, as shown in Fig. 9, the second wheel $t$ will turn over the inner tooth $q$, while the outer depression 7 will permit the other wheel $t$ to turn. These movements acting on the two wheels $t$ cause them to turn in contrary directions. There are thus two quarter-turns given to the shaft $r$ at intervals of half a revolution of the wheel $n$ in either direction, which causes the wheel $i$ to move quickly and correctly in the desired direction. The wheels $t$ might be made with five or six teeth or sides if the wheel or pinion $v$ were made of such a size that one-fifth or one-sixth of a revolution moved the shaft $c$ through the correct distance.

Various methods may be adopted for moving the shaft $r$ endwise; but as it is generally stationary and its motions are never very great it may be moved by hand, or I may employ the handle 12, (shown in Fig. 5,) which engages with a groove in the shaft to prevent its revolving with the latter, or the said handle may be fixed to a rod or lever enabling it to be manipulated from a distance.

To prevent the possibility of an attempt to increase the speed ratio when it is already at its highest, or vice versa, and thus causing the machine to jam, I may adopt the following arrangement, (shown in Fig. 6:) Some of the collars $u$ are removed, leaving a space 13 at each end, so that when the pinion $v$ reaches the end of the said collars either at the maximum or minimum gear, it cannot move the shaft $c$ any farther even if it continues to revolve, and in order to cause the said pinion to pass back into gear again with the said collars I provide springs 14 and 15, one on each side of the bearing $d$, which will press against the bearings $h$ at the two extreme motions, and thus push the collars $u$ back into gear again when desired.

The wheel $i$ may be kept correctly in gear by the stepped plate or bracket 16, one arm 22 of the bearings $h$, Fig. 2, engaging with or being supported by the stepped portions, as shown, or the said bearings may have springs or weights attached to them to keep them down, if necessary.

For direct coupling of the driving and driven machines a motor 17, Fig. 11, may be fixed to one of the bearings $h$ with the wheel $i$ on its shaft 18. This motor is now the driving-machine and moves about with the shaft 18, at the same time transmitting a variable speed to the shaft $o$, Fig. 1, according to which of the gear-wheels $j$, $l$, or $n$ is engaged with the wheel $i$.

Fig. 12 shows an arrangement where neither of the machines may move. In this case the bearings $h$ are connected by end pieces 19 and 20 and the teeth $u$ are formed on a sleeve, the whole being thus enabled to turn around or slide along the shaft $c$. The latter is now independent and fixed to the wheel $a$, and may therefore have one of the machines permanently coupled to either end of it. The shaft $o$ may also be lengthened and permanently coupled to one of the machines. The design here shown gives three different speeds, according as wheel $j$, $l$, or $n$ is in gear with the wheel $i$; but any number of wheels of any size may be fitted to the shaft $o$, thus giving any desired range of gear with any number of intermediate steps. Moreover, if the actual speed is of no importance, but only the average speed required, the intermediate eccentric wheels $k$ and $m$ may be utilized, each giving a speed varying between that of the wheels on each side of it. The addition of a second wheel 21, similar to $i$, gearing with the opposite sides of the wheel $j$ to $n$ (see Fig. 13) and in connection with one of the machines, gives seven different speeds and a much wider range. If in the first case the ratio of speeds was one to two, one to one, and three to two, with the addition of this wheel the speeds will be one to three, one to two, one to one, three to two, two to one, and three to one. Similarly had there been four speeds with only wheel $i$ the addition of the wheel 21 could give thirteen speeds, and generally if $n$ is the number of speeds with only wheel $i$ then $n(n-1)+1$ will be the possible number of speeds with the additional wheel.

Having now described my invention, what I claim as new, and desire to secure by Letters Patent, is—

1. In variable-speed gearing, the combination, with a series of toothed wheels of different sizes provided with coincident portions at prearranged points, of a revoluble toothed wheel movable longitudinally and radially into gear with any of the aforesaid wheels, means for revolving the said parts, and means for sliding the said wheel laterally operated from the said series of toothed wheels.

2. In variable-speed gearing, the combination, with a series of toothed wheels of different sizes provided with coincident portions at prearranged points, of a toothed wheel movable longitudinally and radially into gear with any of the aforesaid wheels, means for revolving the said parts, a driving-shaft having the said toothed wheel secured on it, a revoluble driving-wheel splined to the said shaft, and means for sliding the said toothed wheel and its shaft longitudinally without sliding the said driving-wheel.

3. In variable-speed gearing, the combination, with a series of toothed wheels of different sizes provided with coincident portions at prearranged points, of a revoluble toothed wheel movable longitudinally and radially into gear with any of the aforesaid wheels, means for revolving the said parts, an arm moving longitudinally with the said wheel, and a stationary locking-plate provided with steps with which the said arm engages and which limit the radial movements of the said wheel.

4. In variable-speed gearing, the combination, with a series of toothed wheels of different sizes provided with coincident portions at prearranged points, of a revoluble toothed wheel movable longitudinally and radially into gear with any of the aforesaid wheels, means for revolving the said parts, a slidable toothed rack operatively connected with the said toothed wheel, a revoluble and longitudinally-slidable shaft, a toothed pinion secured on the said shaft and gearing into the said rack, two combined driving and locking wheels also secured on the said shaft, and a wheel or plate revolving with the said series of wheels and provided with laterally-projecting teeth and depressions for operating the said two wheels and thereby sliding the first said wheel laterally at prearranged intervals.

In testimony whereof I affix my signature in presence of two witnesses.

JOHN ST. VINCENT PLETTS.

Witnesses:
ELIZABETH ESTHER WATTS,
BEATRICE ANNIE WOODS.